United States Patent [19]
Schieber

[11] Patent Number: 6,065,352
[45] Date of Patent: May 23, 2000

[54] TURBINE METER WITH A ROTOR HAVING ACCURACY ENHANCING ROTOR BLADES

[75] Inventor: William M. Schieber, Erie, Pa.

[73] Assignee: American Meter Company, Erie, Pa.

[21] Appl. No.: 09/335,827

[22] Filed: Jun. 18, 1999

[51] Int. Cl.[7] .................................. G01F 1/05; B63H 1/26
[52] U.S. Cl. ..................................... 73/861.79; 73/861.83; 416/223 R
[58] Field of Search ........................... 73/861.79, 861.77, 73/861.75, 861.71, 861.83, 861.81; 29/889.21, 889.7; 416/176, 183, 223 R, DIG. 2

[56] References Cited

U.S. PATENT DOCUMENTS

| | | | |
|---|---|---|---|
| 1,669,315 | 5/1928 | Wiggins | 73/861.79 |
| 1,679,557 | 8/1928 | Bailey | 73/861.79 |
| 4,359,311 | 11/1982 | Benesh | 416/197 A |
| 5,341,686 | 8/1994 | Chai | 73/861.79 |
| 5,636,178 | 6/1997 | Ritter | 73/861.79 |
| 5,766,487 | 6/1998 | Park | 73/861.79 |
| 5,813,837 | 9/1998 | Yamamoto et al. | 416/223 R |
| 5,866,824 | 2/1999 | Schieber | 73/861.79 |

*Primary Examiner*—Harshad Patel
*Attorney, Agent, or Firm*—Edward W. Goebel, Jr.; MacDonald, Illig, Jones & Britton LLP

[57] ABSTRACT

A turbine meter used for measuring the volume of fluid flowing through a conduit includes an elongated housing having an upstream end and a downstream end and a rotor mounted within the housing. A plurality of turbine blades are mounted on the rotor at an angle with respect to the axis of rotation of the rotor which causes each of the rotor blades to have a high pressure surface which faces toward the upstream end of the housing. Each of the rotor blades also has a trailing edge closest to the downstream end of the housing. An extension is included at approximately the trailing edge on the high pressure surface of at least one and preferably a plurality of the rotor blades. The extension has a length and forms an angle with respect to the high pressure surface of the rotor blade on which it is mounted which causes the percentage of error of the accuracy of the meter across a chosen operating range of the meter to be within predetermined limits.

30 Claims, 5 Drawing Sheets

TURBINE METER WITH A ROTOR HAVING ACCURACY ENHANCING ROTOR BLADES

BACKGROUND OF THE INVENTION

This invention relates to turbine meters of the type used to measure the flow of fluids by converting kinetic energy of a flowing fluid to rotation of a turbine, and more specifically, to rotors and rotor blades for such turbine meters.

Turbine meters are used to measure the flow of fluids by converting kinetic energy of the flowing fluid to rotation of a turbine. While turbine meters can measure both the flow of liquids and the flow of gases, the theory of operation of gas turbine meters differs somewhat from that of liquid driven meters due to the differences in the density and kinematic viscosity of the two fluids.

Since liquids are essentially incompressible, the density of liquids does not vary significantly with pressure or temperature. Also, the density of liquids is relatively high so there is ample driving torque from liquid flow to overcome mechanical friction in the meter. Thus, small changes in retarding torques, for example due to increases in friction between moving parts, do not affect the performance of liquid turbine meters. Conversely, the density of gas is relatively low so that gas turbine meters are highly sensitive to changes in retarding torques within the meters, especially at low pressure and low flow rates. Changes in kinematic viscosity, however, do affect the performance of both gas turbine meters and liquid turbine meters.

Referring to a gas meter by way of illustration, the total volume of gas passing through the meter is determined by counting the number of revolutions of a measuring rotor mounted within the meter. Gas turbine meters are known as inferential meters because they infer how much gas has passed through by observing something other than the displacement of gas; i.e. gas turbine meters infer how much has passed by measuring the speed of the rotor rotation. A gas turbine meter is a gas velocity measuring device. The actual flow rate can be inferred from the velocity of the gas because the cross-sectional area of the annular passage preceding the rotor is a known quantity.

The driving energy to turn the rotor is the kinetic energy, or energy of motion, of the gas being measured. The gas impinges on rotor blades mounted on the measuring rotor and overcomes retarding forces that inhibit the rotor from turning.

A conventional gas turbine meter typically includes an elongated, cylindrical housing which forms a flow path for gas which is flowing within a pipeline in which the housing is mounted. An inlet flow straightener is mounted adjacent an inlet port in the housing to cause gas flowing from the inlet port to flow in an axial direction within the housing. A measuring rotor is mounted within the housing downstream of the inlet flow straightener so as to rotate about its axis of rotation. In an axial turbine meter the axis of rotation is also the central axis of the cylindrical housing. The measuring rotor has an upstream end and a downstream end with respect to the flow of gas through the housing.

The measuring rotor has turbine blades mounted on it at an angle with respect to its axis of rotation to cause the rotor to rotate at a speed approximately proportional to the velocity of the gas flowing through the housing. Each of the rotor blades has a high pressure surface which faces toward the flow of gas within the housing and a low pressure surface which faces away from the flow of the gas. Each turbine blade also has a leading edge at the upstream end of the rotor and a trailing edge at the downstream end of the rotor.

Gas turbine meters have typically been constructed with a metal cylindrical housing having a removable measuring cartridge mounted within it. The measuring cartridge normally includes at least the measuring rotor, its rotor bearings and a coupling for interconnecting the measuring rotor to a mechanical register mounted on top of the measuring cartridge. The rotor blades are usually mounted on a rotor cylinder, which forms the hub of the rotor.

Gas Meter Accuracy

Gas turbine meters are commonly installed in pipelines used in the natural gas industry for the measurement of the flow of large volumes of gas. The volumes are often large so that small errors in measurement can result in large losses of revenue to gas transmission companies and local distribution companies. An example of the magnitude of losses which can occur was presented in a 1992 technical publication of the Netherlands Measurement Institute. Consider a 12-inch turbine meter operating at a pressure of 580 psig and having a gas volume which is 59% of maximum capacity. Assuming the cost of natural gas is $0.0037 per cubic foot, an error of only 0.2% results in a loss of revenue of $160,000 per year. Clearly it is vital to maintain the accuracy of gas turbine meters.

Each gas turbine meter must be separately calibrated to determine its accuracy after it is manufactured. Calibration is necessary because normal, minor variations in meter components cause each gas turbine meter to register a slightly different volumetric flow for a given volume of gas. By way of example, from meter-to-meter blades on otherwise identical turbine measuring rotors vary slightly in shape due to minor manufacturing inconsistencies. As a result, each turbine measuring rotor rotates at a slightly different speed for gas flowing at the same velocity. Similarly, separate sets of measuring rotor bearings of the same make and model can impose slightly different frictional forces on the rotors of separate meters on which they are mounted. Additionally, the gas turbine meter's mechanical register, sometimes called an index, gives a reading of gas flow volume on a set of dials. The register is typically connected to the turbine measuring rotor through a coupling which includes gears, magnetic couplings and other components which load the turbine rotors of different gas turbine meters to a somewhat different extent. As a result, each gas turbine meter will register its own unique flow level for a given volume of gas.

At the time of manufacture of a gas turbine meter, the accuracy of a meter is proved by testing the meter against a known standard such as a master meter or a bell prover or a sonic nozzle. At a given temperature, a given gas line pressure and a given gas flow rate, the volume of gas registered by the meter is compared to the actual volume of gas which flowed through the meter as determined by the known standard. This ratio of the volume of gas measured by a meter's mechanical register to the actual volume of gas flowing through the meter is called the accuracy of the meter. The calibration factor of a meter, referred to by the letter "K," expressed in terms of pulses per unit of volume flowing through a meter. The calibration factor "K", is the amount by which the registered reading of the meter is divided to get a 100% accurate volume reading. For each of a given series of line pressures at which a gas turbine meter may operate, the K factors are determined for a range of flow rates expected for the meter. A table of these K factors is normally provided with each meter.

Figure 6:
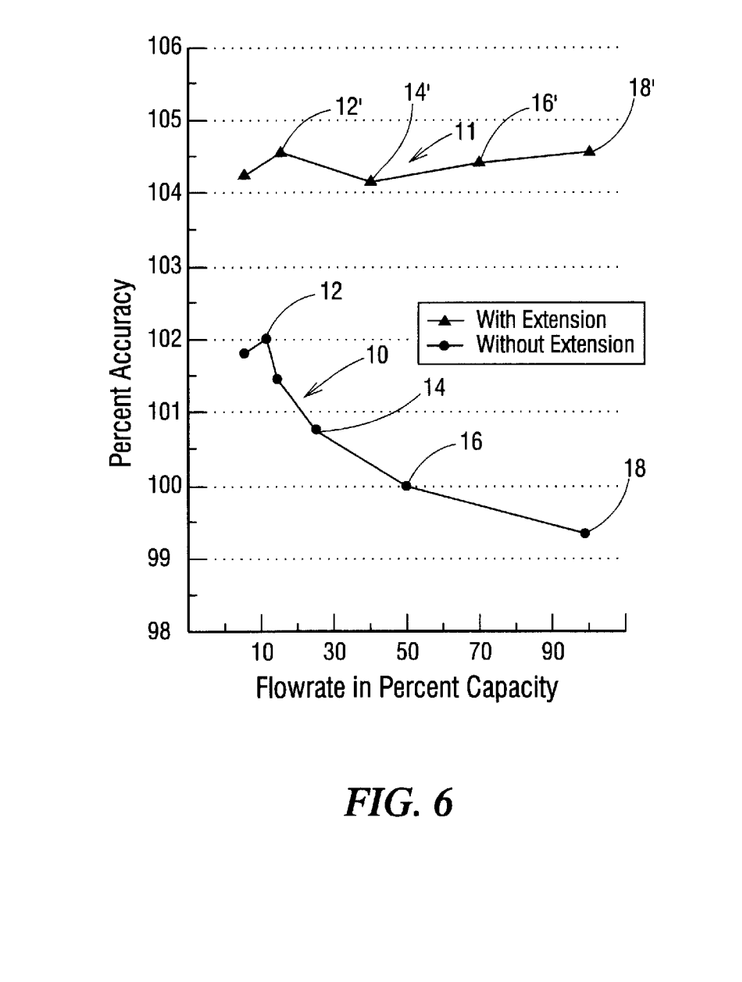
FIG. 6 is a graph of two accuracy curves of a gas turbine meter, one of which is for a meter having a rotor which includes this invention and the other of which is for the same meter having a rotor which does not include this invention.

As a result of the calibration of the meter, the accuracy of the meter at a given line pressure can be graphed over a range of gas flow rates. See FIG. 6 by way of example which shows a graph of two accuracy curves. The lower of the two curves 10 is a typical accuracy curve of a gas turbine meter having rotor blades which do not incorporate this invention. The upper curve 11, which will be discussed more fully in the Description of the Preferred Embodiments, is an accuracy curve of a gas turbine meter using this invention. Along the Y-axis of FIG. 6 is a measurement of the "percent accuracy" of the meter. Along the X-axis is a measurement of the "flow rate" of the meter in terms of the percentage of the total flow rate capacity of the meter. The resulting graphed curved line is the accuracy curve.

The meaning of the graph is as follows: If the amount of gas measured by the meter is equal to the actual amount of gas that has passed, the meter accuracy is 100%. Thus, if the meter reads 100 units of gas and 100 units have actually passed, the meter would be 100% accurate. If the amount of gas measured by the meter is less than the amount of gas that actually flowed, the meter percentage accuracy is said to be less than 100%, and there is a false low. For instance, if a meter reads 99 units of gas when in actuality 100 units of gas has flowed, the meter would be 99% accurate. The meter would be undermeasuring the amount of gas that has actually flowed and the customer will pay too little. If the amount of gas measured is more than the amount that has actually flowed, the meter's percentage accuracy is said to be over 100%, and there is a false high. For instance, if a meter reads 102 units of gas when only 100 units actually flowed, the percent accuracy would be 102%. The meter is overmeasuring the amount of gas that has actually flowed and the customer will pay too much.

As indicated above, the accuracy of the volume of gas recorded on the dials of a meter's register is checked at the time of a meter's calibration over a range of the meter's operating conditions. Components of the meter, such as the gears and magnetic couplings between the measuring rotor and the register, are often modified to attempt to get the accuracy of the meter as consistent as possible over its expected range of gas flow rates.

If the gas meters were inaccurate by the same amount across all flow rates, fewer problems would exist. If a meter consistently overmeasured or undermeasured by the same amount all the time, a correction could easily be made by using the gears or other correcting mechanisms to correct the readings of the register. The correcting mechanism would simply shift the accuracy curve up or down so that it would be 100% accurate all of the time.

However, as can be seen by examining the lower curve 10 of FIG. 6, gas turbine meters do not have the same percentage of error across all flow rates. The accuracy curve 10 is an accuracy curve of a typical prior art gas turbine meter. This gas turbine meter is equipped with 8 inch helical rotor blades which have a mean helical angle of 45° through the axis of rotation of the rotor on which the blades are mounted. The accuracy curve 10 is not linear in that it does not have a constant percentage of error across all flow rates of the meter at the temperature and pressure at which the meter was tested. A linear accuracy curve, which is a desirable characteristic in gas meters, would be a straight line. The accuracy curve 10 shows a non-linear distribution of the percentage of accuracy for a gas turbine meter which is generally representative of most prior art gas turbine meters. The accuracy curves of these turbine meters tend to have an undesirable "hump" at low flow rates at between 10–20% of the maximum flow rate of a meter. Thus, the accuracy curve 10 has a high reading of approximately 102% at point 12 and the readings above and below this flow rate decrease appreciably. Readings below about 5% of the meter capacity measured at atmospheric pressure, become unreliable because gas tends to slip past the clearance between the rotor blades and the walls of the housing in which the rotor is installed.

The accuracy measurement of the turbine meter at a particular line pressure, represented by the accuracy curve 10 in FIG. 6, tends to fall fairly rapidly as the flow rate of the meter increases. At point 14 on the accuracy curve 10, which is about 28% flow rate capacity of the meter, the percentage of accuracy of the meter has decreased to about 100.7%; at point 16, approximately 50% of the flow rate capacity, the percent of accuracy of the meter is 100%; while at point 18, approximately 100% flow rate capacity of the meter, the percent accuracy is about 99.3%. Between about 5% and 100% of the flow rate capacity of this meter the accuracy ranges from a high of 102% to a low of about 99.3%. Thus, the linearity of this meter, that is the difference between the highest percent of accuracy of the meter and its lowest percent of accuracy over the meter's operating range, is about 2.7%.

Only a single set of gears and/or couplings can be installed at one time between the measuring rotor and the dials of a meter's register. Thus, the register can only be calibrated to be 100% accurate at one flow rate, called the change gear rate, which is usually about 50% or 60% of the maximum flow rate of the meter. At other flow rates significant inaccuracies must sometimes be tolerated. As shown by accuracy curve 10, because gas meter accuracy curves are not linear, at some flow rates turbine meters typically undermeasure the amount of gas that has flowed, while at other flow rates they tend to overmeasure the amount of gas that has flowed. The non-linearity of the accuracies of these meters over the range of expected flow rates is difficult to compensate for while calibrating the meter and can result in an undesirable range of inaccuracies for the meter.

SUMMARY

This invention relates to a turbine meter which has an elongated housing that provides a path for the flow of fluid to be measured by the meter. The housing has an upstream end into which the fluid flows and a downstream end out of which the fluid flows. A rotor having an axis of rotation is mounted within the housing.

A plurality of rotor blades is mounted on the rotor at an angle with respect to the axis of rotation of the rotor so that each rotor blade has a high pressure surface which faces toward the upstream end of the housing. Contact of the fluid on the high pressure surface causes the rotor to rotate as the fluid flows. Each of the rotor blades also has a trailing edge closest to the downstream end of the housing. In accordance with this invention, an extension is located at approximately the trailing edge and on the high pressure surface of at least one and preferably a plurality of the rotor blades. The extension has a length and forms an angle with respect to the high pressure surface of a rotor blade which causes the percentage of error across a chosen operating range of the meter to become more linear and within predetermined limits.

In the preferred embodiment of this invention the extension is placed at the trailing edge on the high pressure surface across the width of each of the rotor blades. However, the benefits of this invention can be obtained by placing the extension somewhat away from the trailing edge of the high pressure surface of the rotor blades and/or on fewer than all the rotor blades of a rotor. Additionally, the extension can extend across the total width of each rotor blade on which it is included, or the extension can extend across a portion of the width of a rotor blade if desired. However, the percent of error across a chosen operating range of a meter will become less linear as extensions on the high pressure side of the meter's turbine blades are moved away from the trailing edge or are placed on fewer rotor blades or extend across less than the total width of the rotor blades.

This invention does not reside in any single feature of the turbine meter and rotor disclosed above and in the Description of the Preferred Embodiment and claimed below. Rather, this invention is distinguished from the prior art by its particular combination of features of the turbine meter and rotors disclosed. Important features of this invention have been discussed in the Detailed Description of the Preferred Embodiments of this invention which are shown and described below to illustrate the best mode contemplated to date of carrying out this invention.

Those skilled in the art will realize that this invention is capable of embodiments which are different from those shown, and the details of the structure of the turbine meters and rotors can be changed in various manners without departing from the scope of this invention. Accordingly, the drawings and description are to be regarded as illustrative in nature and are not to restrict the scope of this invention. Thus, the claims are to be regarded as including such equivalent turbine meters and rotors as do not depart from the spirit and scope of this invention.

DESCRIPTION OF PREFERRED EMBODIMENT

Referring to the drawings, identical reference numbers and letters designate the same or corresponding parts throughout the several figures shown.

Figure 1:
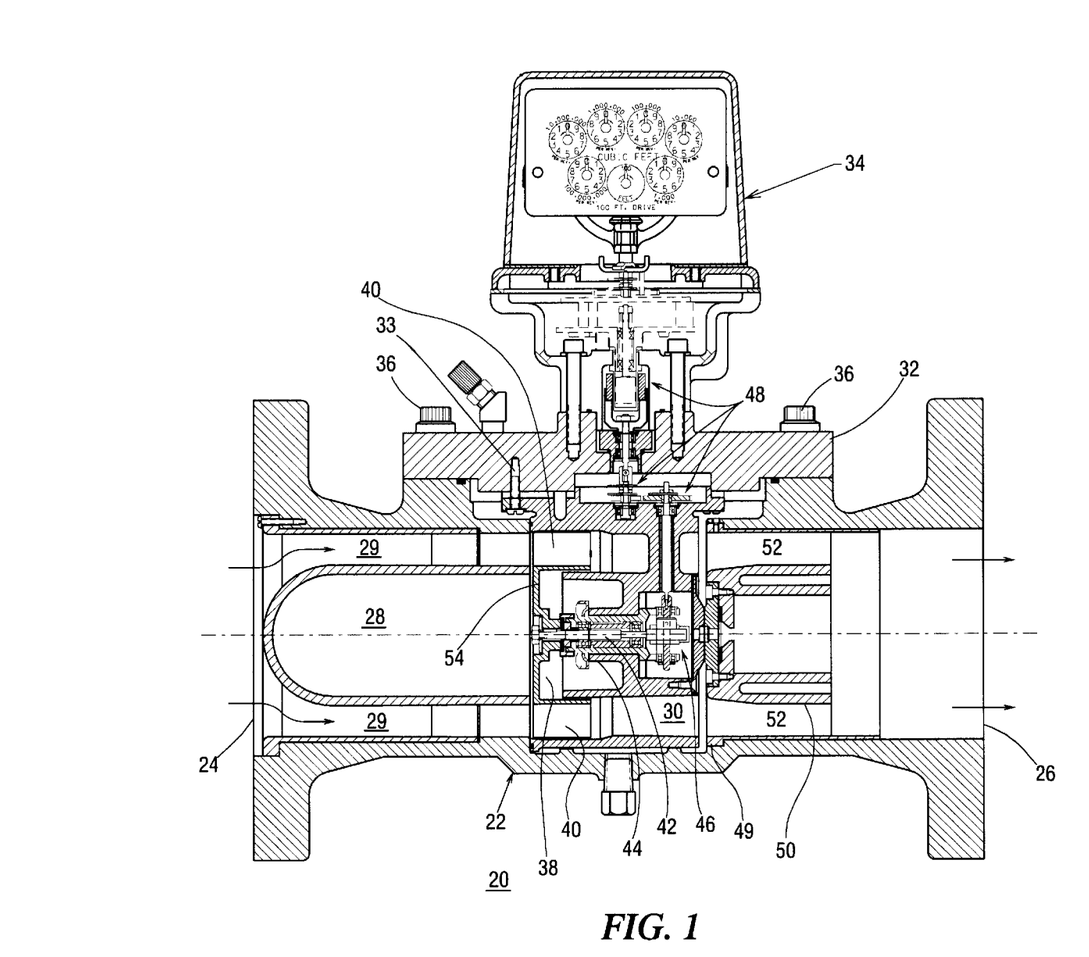
FIG. 1 is a sectional, side view of a gas turbine meter which can incorporate the features of this invention.
Figure 2:
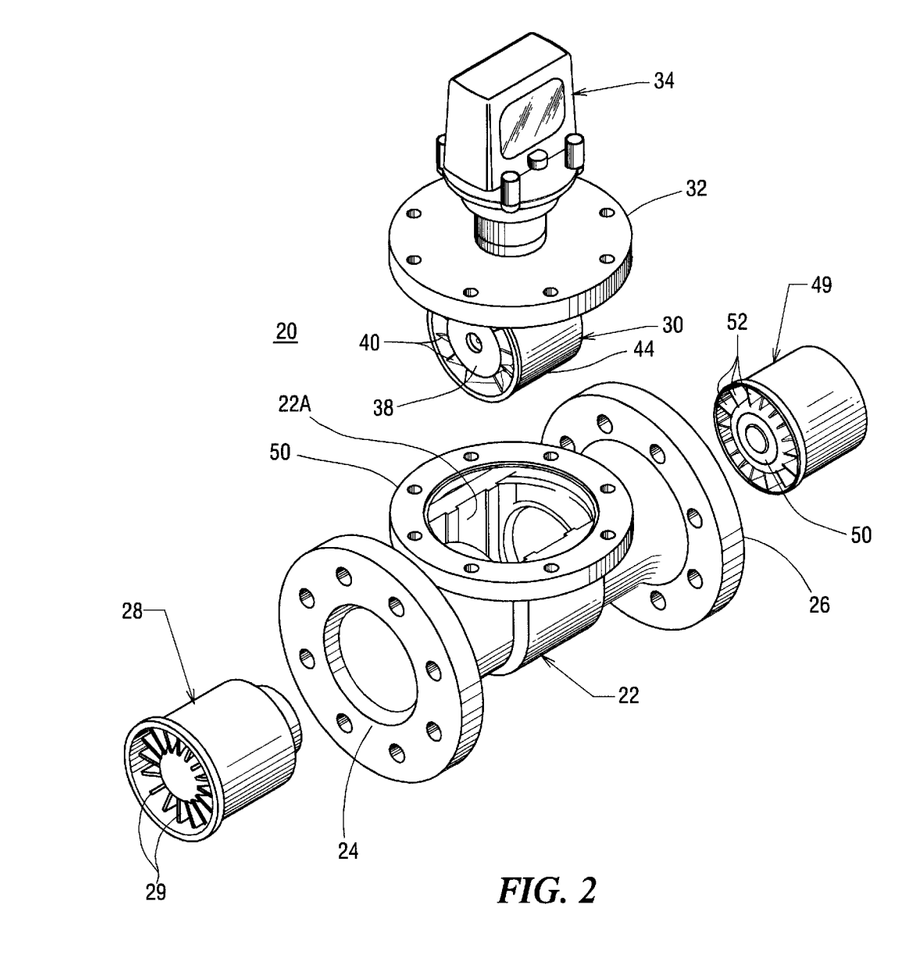
FIG. 2 is an exploded perspective view of a gas turbine meter which can incorporate the features of this invention.

FIG. 1 and FIG. 2 show the basic components of a gas turbine meter in which a rotor incorporating the features of this invention can be installed. A gas turbine meter 20 comprises a metal housing 22 having an inlet port 24 and an outlet port 26. The housing 22 is normally constructed of metal such as aluminum and is designed to withstand the pressures to which it is expected to be submitted when installed in a gas transmission or distribution line.

The gas turbine meter 20 includes an inlet flow straightening assembly 28 adjacent the inlet port 24. The inlet flow straightening assembly 28 has a number of vanes 29 forming passageways that minimize flow disturbances produced in a pipeline in which the gas turbine meter 20 is installed. The flow straightening assembly 28 is not a feature of this invention. Those skilled in the art can use any assembly of this type which is convenient to them.

A measuring cartridge 30 is normally mounted within a central cavity of the elongated housing 22. As seen most clearly in FIG. 2, the measuring cartridge 30 is fastened to a top plate 32 with screws 33 (one of which is shown in FIG. 1), and a register 34 mounted on the top plate 32. Bolts 36 (shown in FIG. 1) fasten the top plate 32 to the housing 22.

A measuring rotor 38 is mounted on the upstream end of the measuring cartridge 30. The measuring rotor 38 includes a number of radially extending turbine blades 40 which, as will be explained below, are mounted at an angle with respect to a central rotor shaft forming an axis of rotation 42 of the rotor 38. The turbine blades 40 cause the rotor to rotate in one direction at a speed approximately proportional with the velocity of gas flowing through the housing 22 and passing the inlet flow straightening assembly 28.

The rotor 38 is mounted on the rotor shaft and within a hub 44 of the measuring chamber 30. The rotor 38 is coupled within the hub 44 to a coupling device 46 which in turn transfers the rotation of the rotor 38 through a series of gears and couplings 48 to the register 34. At the register 34, the rotation of the rotor 38 is converted to the rotation of a series of dials which indicate the volume of gas that has flowed through the meter 20.

The meter 20 further includes a hub assembly 49 comprising a hub 50 which is attached to the downstream side of the measuring chamber 30. The hub 50 has a series of vanes 52 for conditioning the gas as it flows toward the outlet port 26 and from the meter 20.

This structure of the meter 20 is shown by way of example only. It is not intended to limit the structure and type of meter in which this invention can be used.

Figure 3:
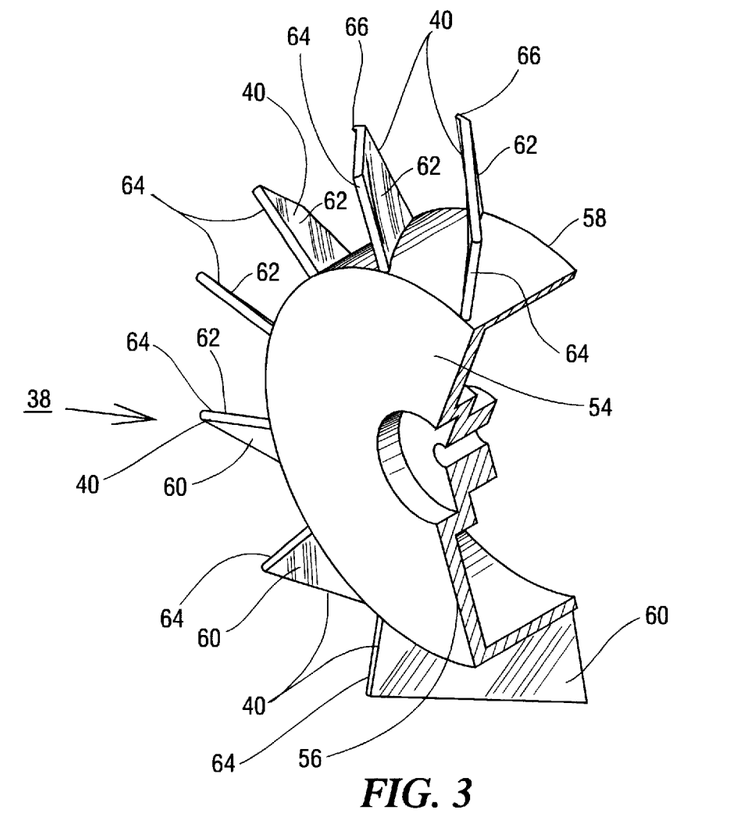
FIG. 3 is a perspective view, partially cut away, of a turbine meter measuring rotor incorporating this invention.

Referring now to FIG. 3, the rotor 38 has a hub 54 on which the rotor blades 40 are mounted. The rotor 38 has an upstream end 56 which is shown in FIG. 1 mounted adjacent the downstream end of the flow straightening assembly 28. The rotor 38 also has a downstream end 58.

Each of the rotor blades 40 is mounted at an angle with respect to the axis of rotation of the rotor 38. The turbine blades 40 have a helical twist which reduces flow interaction between the blades and thus improves the performance of the gas turbine meter 20. The angle of the turbine blades 40 and the helical twist are more clearly illustrated in FIG. 4. For turbine blades having a 45° angle, a helical twist has a lead of 10.542 inches and a mean helix angle of 45°.

Figure 4:
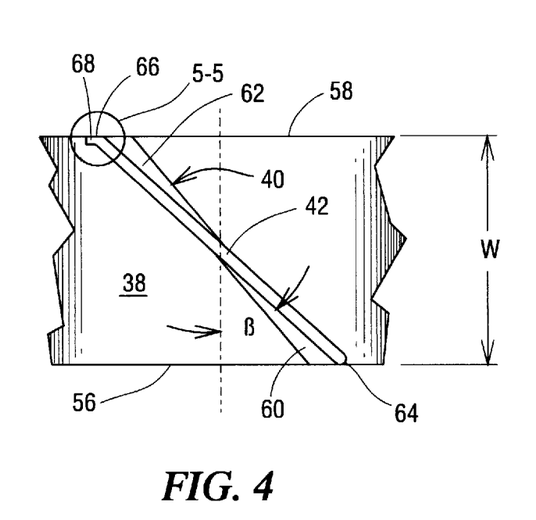
FIG. 4 is a partial top view of the measuring rotor showing one of its turbine blades that incorporates this invention.

The capacity of the rotor, and thus the capacity of the gas turbine meter 20, can be changed by changing the angle of the rotor blades 40. By way of example, the capacity of the rotor 38 can be increased by changing the rotor blade angle to 30°. Additionally, turbine blades can be used which do not have a helical twist.

Each turbine blade 40 has a high pressure surface 60 which faces toward the flow of gas when the rotor 38 is mounted within the housing 22 of the meter 20. It is the gas pressure on the high pressure surfaces 60 that causes the rotor 38 to rotate within the housing 22 of the meter 20. The rotor blades 40 each have a low pressure surface 62 which faces away from the flow of gas through the housing 22.

Figures 5, 5A:
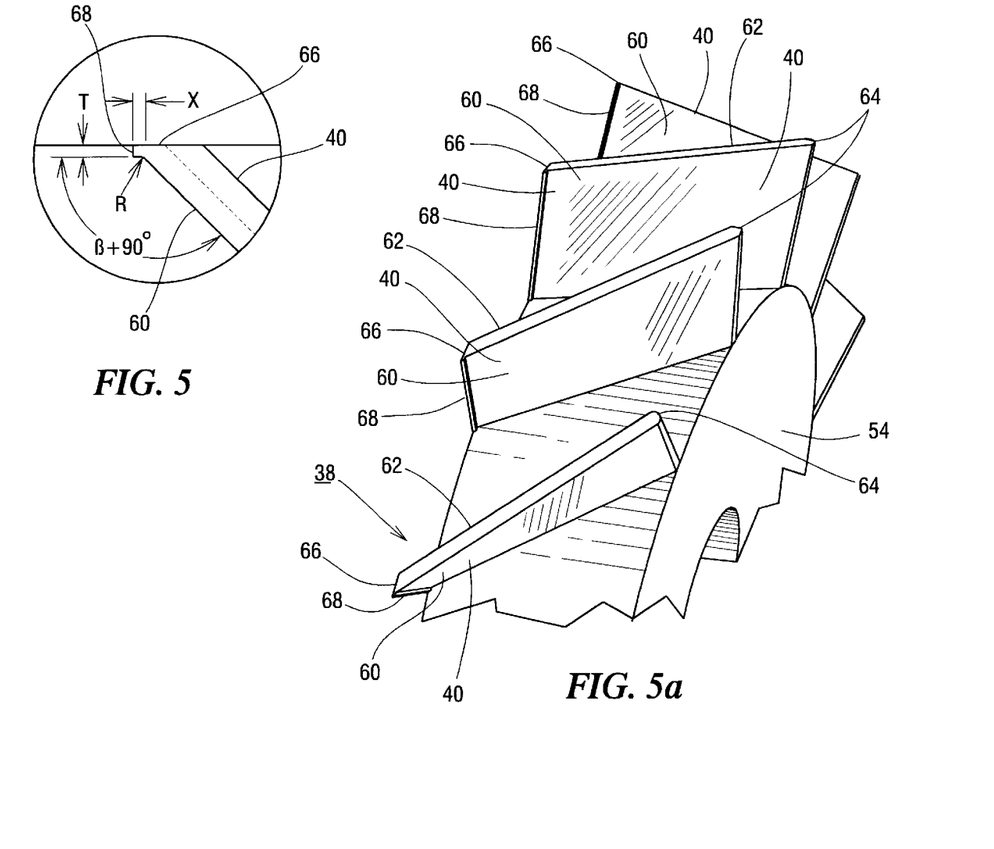
FIG. 5 shows an enlarged detail of a portion of the turbine blade shown in FIG. 4 which includes this invention.
FIG. 5a shows a perspective view of a portion of a measuring rotor having turbine blades which include this invention.

As shown in both FIG. 3 and FIG. 4, each of the turbine blades 40 has a leading edge 64 at the upstream end of the rotor 38 and a trailing edge 66 at the downstream end of the rotor 38. The circled portion 5—5 of the trailing edge 66 shown in FIG. 4 is enlarged and shown more clearly in FIG. 5 and is shown in a perspective view in FIG. 5a. In accordance with this invention, an extension 68 is located at approximately the trailing edge 66 and on the high pressure surface 60 of at least one and preferably a plurality of the rotor blades 40 of the rotor 38. In the preferred embodiment of this invention, an extension 68 is located along the total width of the trailing edge 66 on the high pressure surface of each of the rotor blades 40. The extension should have a length and should form an angle with respect to the high pressure surface 60 which causes the accuracy curve of the meter to become more linear. Thus, the extension 68 causes the percentage error across the chosen operating range of the meter 20 to be within predetermined limits of error. These limits of error are determined for each meter by testing it when it is being designed. The angle of the extension 68 with respect to the high pressure surface 60 of a turbine blade is normally 90° plus the angle β the blade forms with respect to the axis of the meter. FIG. 5 shows this angle to be 135° for a 45° blade. This angle would normally be 120° for turbine blades of a 30° meter.

Referring to FIG. 6, accuracy curve 11 shows the accuracy of the 8 inch gas meter with a 45° rotor, which was discussed above and shown in FIGS. 5 and 5a, after extension 68 was added to the trailing edge 66 of the high pressure side 60 of each of the turbine blades 40 of this meter. This meter had the same gears and couplings installed between the rotor 38 and the dials of the register 34 as were used when the accuracy at the points on the accuracy curve 10 was measured.

Accuracy curve 11 shows that adding the extension 68 increased the rotor speed at all flow rates of the meter. However, the extension 68 increased the rotor speed more at higher flow rates of the meter than it did at lower flow rates of the meter. Thus, at point 12" of accuracy curve 11, which is approximately 10% of the flow rate capacity of the meter, the accuracy is about 104.5%; at point 14" which is approximately 25% of the flow rate capacity of the meter the accuracy is about 104.1%; at point 16" which is approximately 70% of the flow rate capacity of the meter the accuracy is about 104.4%; and at point 18" which is about 100% of the flow rate capacity of the meter, the accuracy is about 104.6%. The linearity of this meter is about 0.5% using the trailing edge extensions.

Thus, the 8 inch meter represented by FIG. 6 had an improvement in linearity from about 2.7% to about 0.5% between its 5% and 100% flow rate capacities as a result of adding extension 68 along the entire trailing edge of the high pressure surfaces of the turbine blades of the meter. Additionally, the accuracy shifted about 4.4% at the change gear rate of 50% of the capacity of the meter. The gear ratios of the gears between the rotor 38 and the register 34 of this meter would be changed prior to the installation of this meter in a gas line so as to move the accuracy curve down about 4.4% at 50% of the flow rate capacity of this meter.

Figure 7:
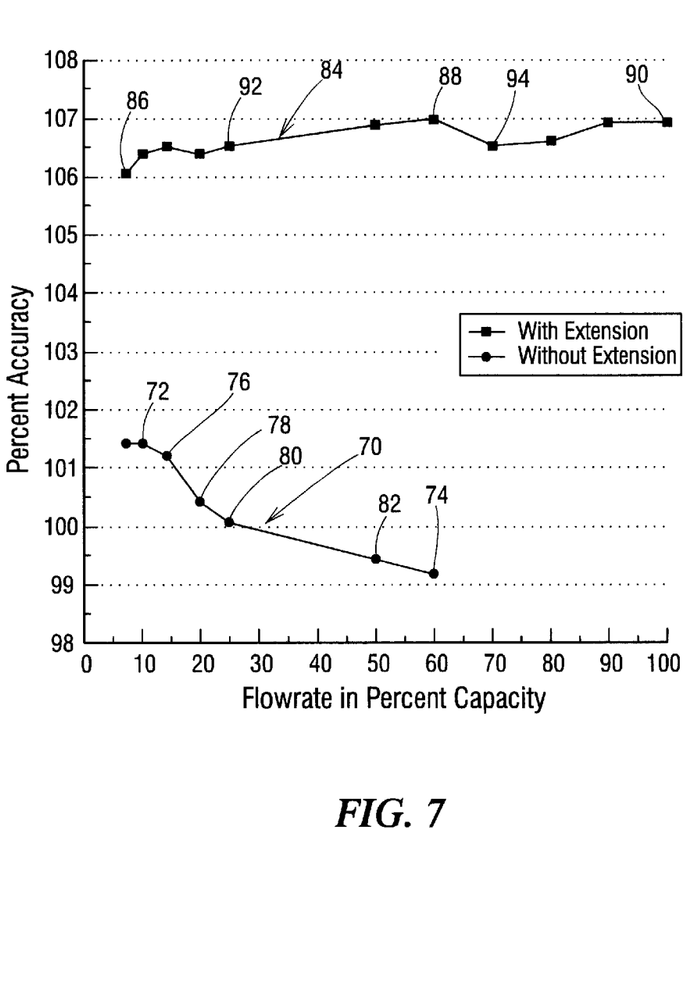
FIG. 7 is a graph of two accuracy curves of a gas turbine meter, one of which is for a meter having a rotor which includes this invention and the other of which is for the same meter having a rotor which does not include this invention.

FIG. 7 shows the effects of adding the extensions 68 on the trailing edge 66 of the high pressure surfaces 60 of the turbine blades 40 of a 4 inch gas meter having a 30° rotor. Without the use of these extensions, the accuracy measurement of this 4 inch turbine meter also tends to fall fairly rapidly as the flow rate of this meter increases. The accuracy curve 70 shows that the percent of accuracy of this meter is about 101.5% at around an 8% flow rate capacity shown at point 72 of the curve. The percent of accuracy decreases to about 99.2% accuracy at 60% flow rate capacity shown at point 74 of the accuracy curve 70. In between these extremes, at 15% flow rate capacity shown at point 76, the accuracy is about 101.2%; at about 20% flow rate capacity as shown at point 78 the accuracy is about 104%; at about 25% flow rate capacity at point 80 the accuracy is about 101%; and at about 50% flow rate capacity at point 82 the accuracy curve 70 shows about 99.4% accuracy.

As shown by the accuracy curve 84 in FIG. 7, adding extension 68 to the trailing edge 66 of the high pressure surface 60 of each of the rotor blades causes the rotor blades of the 4 inch meter with a 30° rotor raise the accuracy curve by about 6.5% at a flow rate of 25% capacity and by about 7.4% at the change gear flow rate of 50% capacity. The accuracy ranges from about 106.2% at about 8% flow rate capacity at point 86 to a high of about 106.9% at about 60% flow rate capacity at point 88 and 106.8% at point 90 which is about 100% flow rate capacity. Accuracy curve 84 also shows that the accuracy is about 106.5% at point 92 which is about 25% flow rate capacity and at point 94 which is about 60% flow rate capacity. Thus, the linearity of the 4 inch 30° rotor was improved from 2.2%, as shown on accuracy curve 70, to about 0.8%, as shown by accuracy curve 84, as a result of adding extensions to the trailing edge of the high pressure surfaces of the turbine blades. If this 4 inch meter were to be installed in a gas line with the extension 68 on its rotor blades, the gears between the rotor and the dials of the register of the meter would be changed to cause accuracy curve 84 to be centered on 100% accuracy.

The turbine blades of fluid meters are sometimes compared to air foils which convert the motion of fluid into a rotating force which is normal to the flow of the fluid. As a result of tests conducted following the discovery which led to this invention, it is believed that the extensions 68 located at approximately the trailing edges 66 of the high pressure surfaces 60 of the turbine blades can be compared to trailing edge flaps which have sometimes been added to air foils such as airplane wings. Adding trailing edge flaps increases the lift of air foils as the speed of the fluid passing the air foils increases. The change in lift is non linear, increasing as the speed of the fluid increases relative to the air foil itself. As a result, applying this theory to fluid meters, the accuracy of the meter to which extensions are added to the trailing edges of rotor blades is increased proportionately less at the lower flow rates than it is at the higher flow rates of the meter.

Referring to FIG. 5, both the length of the extension 68 and the angle between extension 68 and the high pressure surface 60 of the rotor blade on which the extension 68 is mounted controls the amount of lift provided by the extension 68. Both the length of the extension 68 and the angle between the extension 68 and the high pressure surface are chosen empirically. In the preferred embodiment of this invention, the junction between the high pressure surface 60 and the extension 68 is a gradual surface which can be formed as an arc having a particular radius "R." The extension 68 has a length "x" as measured from the point where the extension leaves the high pressure surface 60 to the end of the extension 68. The extension 68 used for the 8 inch 45° gas meter represented by FIG. 6 had a length of 0.015" and formed an angle between the radically lower surface of the extension 68 and the high pressure surface 60 of the rotor blade of 135°, that is 90° plus the 45° angle the turbine blades form with the axis of rotation of the measuring rotor. The thickness "T" of the extension 68 is chosen to prevent foreign particles in the flow of gas from damaging or removing the flap from the trailing edge of the rotor blade on which it is mounted. A thickness of 0.015" was chosen for the 8 inch 45° rotor. A 0.016" radius R between the lower surface of the extension 68 and the high pressure surface 60 of the rotor blade gradually blended these surfaces together.

The 4 inch, 30° gas meter represented by FIG. 7 has a trailing edge flap that was 0.016" long with a 135° angle between the radially lower surface of the extension 68 and the high pressure surface of the rotor blade. It also had a thickness of 0.016".

Any angle between the radially inward surface of the extension 68 and the high pressure surface 60 can be chosen and tested for its effect on the accuracy of the meter. However, machining difficulties make it more expedient to limit the choice of angle to 90° plus the blade angle of turbine blades of the meter.

The optimum length x of the extension is chosen empirically for each size and type of turbine meter. The accuracy of the meter is tested for each length x of the extension 68 which is chosen to predetermine the linearity of the meter using an extension of that length on its turbine blades. The length of the extensions resulting in the smallest linearity of the meter is chosen for the rotor blades.

As a result, a formula has been developed to predict, for a given length x of the extension shown in FIG. 5, the approximate change in the "K" factor of the meter that can be expected by adding the extension 68 to the trailing edge of the turbine blades of the meter. This is helpful in determining the approximate change in gearing required to cause the accuracy curve of the meter to be approximately 100% at its change gear flow rate. The formula is:

$$\frac{K_2}{K_1} = \left[2 - \frac{\Theta_k}{\pi} + \frac{1}{\pi}\sin\Theta_k\right]^{\frac{1}{2}}$$

The angle $\Theta_k$ can be obtained in terms of the width of the rotor W and the length of the trailing edge flap x from the geometry.

$$\Theta_k = \cos^{-1}\left[1 - \frac{2}{1 + \frac{X}{W}\sin\beta\cos\beta}\right]$$

As seen in FIG. 4, "W" is the width of the rotor on which the turbine blades have been mounted, and β is the angle of the turbine blades with respect to the axis of the meter.

Figure 5B:
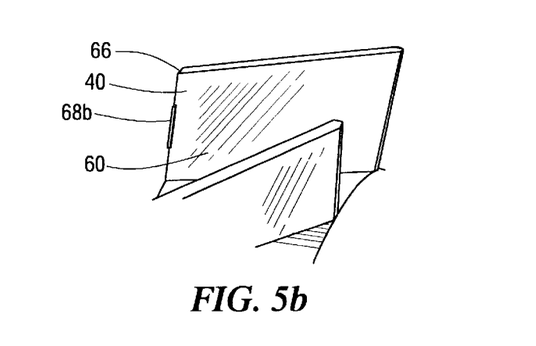
FIG. 5b shows a perspective view of a turbine blade which includes another embodiment of this invention.
Figure 5C:
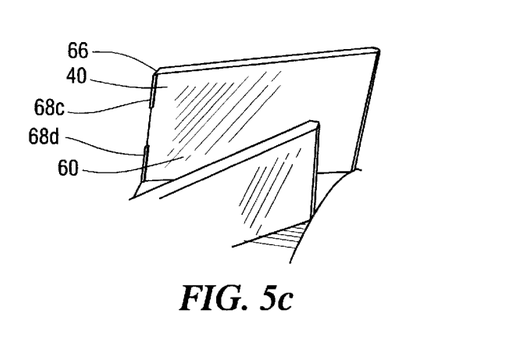
FIG. 5c shows a perspective view of a turbine blade which includes still another embodiment of this invention.

The benefits of this invention can be obtained by adding the extension 68 to the trailing edge of the high pressure surface of fewer than all of the rotor blades of a meter. It can also be obtained by adding the extension over a portion of the width of the trailing edge of the rotor blades to which the extension 68 is added. FIG. 5b shows an extension 68b which extends across the middle third of the trailing edge 66 of the turbine blade 40. FIG. 5c shows extensions 68c and 68d at either end of the trailing edge 66 of the turbine blade 40. Those skilled in the art will recognize that the lift attained from adding the extension will be less with fewer rotor blades having the extension. It will also be less if the extensions do not extend across the total width of the rotor blades on which it has been added. Here again, the number of rotor blades on which the extension 68 is included and/or a portion of the width of the rotor blades over which the extension 68 is located are chosen empirically as a particular rotor is developed. While it is preferable to place the extension at the trailing edge of the rotor blades on which it is included, the extension 68 can be placed radially somewhat inwardly of the trailing edge along the high pressure surface of the rotor blades and still obtain some of the benefits of this invention. However, the lift obtained and the benefits resulting will be less as the extension 68 is moved farther from the trailing edge of the rotor blades.

Those skilled in the art will recognize that this invention has been explained with regard to the details and arrangements of the illustrated embodiment to explain the nature of this invention. Many modifications can be made to this invention by those skilled in the art without departing from its spirit and scope. Thus, the claims are intended to be interpreted to cover such equivalent rotary meters which do not depart from the spirit and scope of this invention.

What is claimed is:

1. A turbine meter for measuring a volume of fluid flowing through a conduit comprising:

an elongated housing defining a path for fluid to flow through said meter; said housing having an upstream end at which fluid enters said meter and a downstream end out of which fluid exits said meter;

a rotor mounted within said housing, and having an axis of rotation;

a plurality of rotor blades mounted on said rotor at an angle with respect to said axis of rotation of said rotor such that each of said rotor blades has a high pressure surface which faces toward said upstream end of said housing, each of said rotor blades having a trailing edge closest to said downstream end of said housing;

an extension on said high pressure surface of at least one of said rotor blades, said extension having a length from a point where said extension leaves said high pressure surface to the end of said extension, a position on said high pressure surface and forming an angle with respect to said high pressure surface which cause the percentage of error of a measured accuracy of said meter across a chosen operating range of said meter to be within predetermined limits.

2. A turbine meter according to claim 1 in which the position of said extension on said high pressure surface is about at said trailing edge on said high pressure surface of said at least one of said rotor blades.

3. A turbine meter according to claim 1 in which said extension forms an angle with respect to said high pressure surface which is about 90° plus the angle at which said rotor blades are mounted with respect to the axis of rotation of said rotor.

4. A turbine meter according to claim 1 in which the position of said extension is at said trailing edge on said high pressure surface of said at least one of said rotor blades, and said extension forms an angle with respect to said high pressure surface which is about 90° plus the angle at which said rotor blades are mounted with respect to the axis of rotation of said rotor.

5. A turbine meter according to claim 1 in which said extension is mounted on a plurality of said rotor blades.

6. A turbine meter according to claim 1 in which said extension is mounted on a plurality of said rotor blades, and the position of said extension on said high pressure surface is about at said trailing edge on said high pressure surface.

7. A turbine meter according to claim 1 in which said extension is mounted on a plurality of said rotor blades and said extension forms an angle with respect to said high pressure surface which is about 90° plus the angle at which said rotor blades are mounted with respect to the axis of rotation of said rotor.

8. A turbine meter according to claim 1 in which said extension is mounted on a plurality of said rotor blades and the position of said extension is at said trailing edge on said high pressure surface of said at least one of said rotor blades, and said extension forms an angle with respect to said high pressure surface which is about 90° plus the angle at which said rotor blades are mounted with respect to the axis of rotation of said rotor.

9. A turbine meter according to claim 1 in which said extension is mounted on all of said rotor blades.

10. A turbine meter according to claim 1 in which said extension is mounted on all of said rotor blades and the position of said extension on said high pressure surface is about at said trailing edge on said high pressure surface of said at least one of said rotor blades.

11. A turbine meter according to claim 1 in which said extension is mounted on all of said rotor blades, said extension forms an angle with respect to said high pressure surface which is about 90° plus the angle at which said rotor blades are mounted with respect to the axis of rotation of said rotor.

12. A turbine meter according to claim 1 in which said extension is mounted on all of said rotor blades, the position of said extension is at said trailing edge on said high pressure surface of said at least one of said rotor blades, and said extension forms an angle with respect to said high pressure surface which is about 90° plus the angle at which said rotor blades are mounted with respect to the axis of rotation of said rotor.

13. A turbine meter according to claim 1 in which said extension is located along the total length of said trailing edge on said high pressure surface of said at least one of said rotor blades.

14. A turbine meter according to claim 1 in which said extension is located along the total length of said trailing edge on said high pressure surface of said at least one of said rotor blades and the position of said extension on said high pressure surface is about at said trailing edge on said high pressure surface of said at least one of said rotor blades.

15. A turbine meter according to claim 1 in which said extension is located along the total length of said trailing edge on said high pressure surface of said at least one of said rotor blades, said extension forms an angle with respect to said high pressure surface which is about 90° plus the angle at which said rotor blades are mounted with respect to the axis of rotation of said rotor.

16. A turbine meter according to claim 1 in which said extension is located along the total length of said trailing edge on said high pressure surface of at least one of said rotor blades, the position of said extension is at said trailing edge on said high pressure surface of said at least one of said rotor blades, and said extension forms an angle with respect to said high pressure surface which is about 90° plus the angle at which said rotor blades are mounted with respect to the axis of rotation of said rotor.

17. A turbine meter according to claim 1 in which said extension is located along the total length of said trailing edge on said high pressure surface of a plurality of said rotor blades.

18. A turbine meter according to claim 1 in which said extension is located along the total length of said trailing edge on said high pressure surface of all of said rotor blades.

19. A turbine meter according to claim 1 in which said extension is located along less than the total length of said trailing edge on said high pressure surface of said at least one of said rotor blades.

20. A turbine meter according to claim 1 in which said extension is located along less than the total length of said trailing edge on said high pressure surface of said at least one of said rotor blades and the position of said extension on said high pressure surface is about at said trailing edge on said high pressure surface of said at least one of said rotor blades.

21. A turbine meter according to claim 1 in which said extension is located along less than the total length of said trailing edge on said high pressure surface of said at least one of said rotor blades, said extension forms an angle with respect to said high pressure surface which is about 90° plus the angle at which said rotor blades are mounted with respect to the axis of rotation of said rotor.

22. A turbine meter according to claim 1 in which said extension is located along less than the total length of said trailing edge on said high pressure surface of at least one of said rotor blades, the position of said extension is at said trailing edge on said high pressure surface of said at least one of said rotor blades, and said extension forms an angle with respect to said high pressure surface which is about 90° plus the angle at which said rotor blades are mounted with respect to the axis of rotation of said rotor.

23. A turbine meter according to claim 1 in which said extension is located along less than the total length of said trailing edge on said high pressure surface of a plurality of said rotor blades.

24. A turbine meter according to claim 1 in which said extension is located along less than the total length of said trailing edge on said high pressure surface of all of said rotor blades.

25. A turbine meter according to claim 1 in which said extension is at said trailing edge on said high pressure surface of all of said rotor blades, said extension forms an angle with respect to said high pressure surface which is about 90° plus the angle at which said rotor blades are mounted with respect to the axis of rotation of said rotor, and the junction between said high pressure surface and said extension is a gradual surface formed as an arc.

26. A turbine meter according to claim 1 in which said extension is at said trailing edge on said high pressure surface of a plurality of said rotor blades, said extension forms an angle with respect to said high pressure surface which is about 90° plus the angle at which said rotor blades are mounted with respect to the axis of rotation of said rotor, and the junction between said high pressure surface and said extension is a gradual surface formed as an arc.

27. A turbine meter for measuring a volume of gas flowing through a conduit comprising:

an elongated housing defining a path for gas to flow through said metere said housing having an upstream end at which gas enters said meter and a downstream end out of which gas exits said meter;

a rotor mounted within said housing, and having an axis of rotation;

a plurality of rotor blades mounted on said rotor at an angle with respect to the axis of rotation of said rotor such that each of said rotor blades has a high pressure surface which faces toward said upstream end of said housing, each of said rotor blades having a trailing edge closest to said downstream end of said housing;

an extension substantially at said trailing edge on said high pressure surface of plurality of said rotor blades, said extension being along at least a substantial portion of the length of said plurality of said rotor blades and forming an angle with respect to said high pressure surface which is about 90° plus the angle at which said rotor blades are mounted with respect to the axis of rotation and said extension having a length from a point where said extension leaves said high pressure surface to the end of side extension which causes the percentage of error of a measured accuracy of said meter across a chosen operating range of said meter to be within predetermined limits.

28. A turbine meter according to claim 27 in which said extension is at said trailing edge on said high pressure surface of all said rotor blades.

29. A turbine meter according to claim 27 in which said extension is at said trailing edge on said high pressure surface of all said rotor blades and the junction between said high pressure surface and said extension is a gradual surface formed as an arc.

30. A method of determining the approximate change in the known "K" factor $K_1$, of a gas turbine meter having (i) an elongated housing defining a path for gas flow through said meter, said housing having an upstream end at which gas enters said meter and a downstream end out of which gas exits said meter, (ii) a rotor having a width W mounted within said housing and having an axis of rotation, and (iii) a plurality of rotor blades mounted on said rotor at an angle $\beta$ with respect to the axis of rotation of said rotor such that each of said rotor blades has a high pressure surface which faces toward the upstream end of said housing, each of said rotor blades having a trailing edge closest to said downstream end of said housing, with the change in "K" factor occurring after the addition of an extension on said high pressure surface forming an angle $\beta$ plus 90° with respect to said high pressure surface and having a length X and a position on said high pressure surface which cause the percentage of error of a measured accuracy of said meter across a chosen operating range of said meter to be within predetermined limits, with the approximate change in "K" factor determined by the acts:

a) determining the angle $\Theta_k$ where $$\Theta_k = \cos^{-1}\left[1 - \frac{2}{1 + \frac{X}{W}\sin\beta\cos\beta}\right], \text{ and}$$

b) using the angle $\Theta_k$ to determine the "K" factor, $K_2$, of a turbine meter after the extension is added where $$\frac{K_2}{K_1} = \left[2 - \frac{\Theta_k}{\pi} + \frac{1}{\pi}\sin\Theta_k\right]^{\frac{1}{2}}.$$

* * * * *